(12) United States Patent
Wilbur et al.

(10) Patent No.: US 9,169,406 B2
(45) Date of Patent: *Oct. 27, 2015

(54) COATING COMPOSITIONS

(71) Applicant: Dow Global Technologies LLC, Midland, MI (US)

(72) Inventors: Jeffrey Wilbur, Midland, MI (US); Dharakumar Metla, Chalfont, PA (US); Denise Lindenmuth, Ambler, PA (US); Ray Drumright, Midland, MI (US); David L. Malotky, Midland, MI (US); Bernhard Kainz, Lauf (DE)

(73) Assignee: Dow Global Technologies LLC, Midland, MI (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/736,492

(22) Filed: Jan. 8, 2013

(65) Prior Publication Data
US 2014/0141268 A1 May 22, 2014

Related U.S. Application Data

(63) Continuation-in-part of application No. 13/039,138, filed on Mar. 2, 2011, now Pat. No. 8,349,929, which is a continuation-in-part of application No. 12/559,056, filed on Sep. 14, 2009, now Pat. No. 8,063,128, which is a continuation of application No. 10/925,693, filed on Aug. 25, 2004, now Pat. No. 7,803,865.

(60) Provisional application No. 61/729,014, filed on Nov. 21, 2012, provisional application No. 60/497,527, filed on Aug. 25, 2003, provisional application No. 60/548,493, filed on Feb. 27, 2004.

(51) Int. Cl.
| | |
|---|---|
| C08F 290/04 | (2006.01) |
| B32B 15/08 | (2006.01) |
| C08F 10/00 | (2006.01) |
| C09D 7/12 | (2006.01) |
| C09D 123/10 | (2006.01) |
| C08L 91/06 | (2006.01) |

(52) U.S. Cl.
CPC .............. *C09D 7/125* (2013.01); *C09D 123/10* (2013.01); *C08L 91/06* (2013.01); *C08L 2201/54* (2013.01); *Y10T 428/31692* (2015.04)

(58) Field of Classification Search
CPC ..... C09D 7/125; C08L 23/00; C08L 2205/08; C08L 91/06
USPC ............................ 524/504; 428/461; 526/348
See application file for complete search history.

(56) References Cited

U.S. PATENT DOCUMENTS

| | | |
|---|---|---|
| 3,166,613 A | 1/1965 | Wright et al. |
| 3,245,934 A | 4/1966 | Krzyszkowski |
| 3,422,049 A | 1/1969 | McClain |
| 3,432,483 A | 3/1969 | Peoples et al. |
| 3,456,044 A | 7/1969 | Pahlke |
| 3,554,994 A | 1/1971 | Maloney et al. |
| 3,645,992 A | 2/1972 | Elston |
| 3,741,253 A | 6/1973 | Brax et al. |
| 3,746,681 A | 7/1973 | McClain |
| 3,908,050 A | 9/1975 | Gor |
| 4,038,477 A | 7/1977 | Inoue et al. |
| 4,076,698 A | 2/1978 | Anderson et al. |
| 4,352,849 A | 10/1982 | Mueller |
| 4,542,199 A | 9/1985 | Kaminsky et al. |
| 4,543,399 A | 9/1985 | Jenkins, III et al. |
| 4,551,380 A | 11/1985 | Schoenberg |
| 4,588,790 A | 5/1986 | Jenkins, III et al. |
| 4,597,920 A | 7/1986 | Golike |
| 4,599,392 A | 7/1986 | McKinney et al. |
| 4,689,351 A | 8/1987 | Endo et al. |
| 4,749,616 A | 6/1988 | Liu et al. |
| 4,752,597 A | 6/1988 | Turner |
| 4,798,081 A | 1/1989 | Hazlitt et al. |
| 4,808,561 A | 2/1989 | Welborn, Jr. et al. |
| 4,818,785 A | 4/1989 | Otawa et al. |
| 4,820,557 A | 4/1989 | Warren |
| 4,837,084 A | 6/1989 | Warren |
| 4,865,902 A | 9/1989 | Golike et al. |
| 4,871,705 A | 10/1989 | Hoel |
| 4,897,455 A | 1/1990 | Welborn, Jr. et al. |
| 4,912,075 A | 3/1990 | Chang |
| 4,927,708 A | 5/1990 | Herran et al. |
| 4,937,217 A | 6/1990 | Chang |

(Continued)

FOREIGN PATENT DOCUMENTS

| | | |
|---|---|---|
| DE | 4428382 | 2/1996 |
| EP | 0277003 | 8/1988 |

(Continued)

OTHER PUBLICATIONS

International Search Report from related PCT Application PCT/US2004027641 completed Dec. 8, 2004.
International Search Report from related PCT Application PCT/US2005/006493 completed May 31, 2005.
Randall, "A Review of High Resolution Liquid 13 Carbon Nuclear Magnetic Resonance Characterizations of Ethylene-Based Polymers" JMS-REV, Journal of Macromolecular Science, Part C: Polymer Reviews, 1989, pp. 201-317.

(Continued)

*Primary Examiner* — William Cheung
(74) *Attorney, Agent, or Firm* — Brooks, Cameron & Huebsch, PLLC

(57) ABSTRACT

Embodiments of the present disclosure are directed towards coating compositions comprising from 50 to 85 percent of an aqueous dispersion based on a total weight of the coating composition, an abrasion reducing composition, a solvent, a basic water composition, and a crosslinker.

14 Claims, No Drawings

(56) References Cited

U.S. PATENT DOCUMENTS

| | | |
|---|---|---|
| 4,937,301 A | 6/1990 | Chang |
| 4,952,451 A | 8/1990 | Mueller |
| 4,963,419 A | 10/1990 | Lustig et al. |
| 4,988,781 A | 1/1991 | McKinney et al. |
| 4,996,259 A | 2/1991 | Koehler et al. |
| 5,008,288 A | 4/1991 | Stracher et al. |
| 5,017,714 A | 5/1991 | Welborn, Jr. |
| 5,028,670 A | 7/1991 | Chinh et al. |
| 5,059,481 A | 10/1991 | Lustig et al. |
| 5,086,025 A | 2/1992 | Chang |
| 5,120,867 A | 6/1992 | Welborn, Jr. |
| 5,132,262 A | 7/1992 | Rieger et al. |
| 5,147,949 A | 9/1992 | Chang |
| 5,198,401 A | 3/1993 | Turner et al. |
| 5,228,531 A | 7/1993 | Patterson et al. |
| 5,238,892 A | 8/1993 | Chang |
| 5,243,001 A | 9/1993 | Winter et al. |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,296,434 A | 3/1994 | Karl et al. |
| 5,304,614 A | 4/1994 | Winter et al. |
| 5,324,800 A | 6/1994 | Welborn, Jr. et al. |
| 5,360,648 A | 11/1994 | Falla et al. |
| 5,364,486 A | 11/1994 | Falla et al. |
| 5,387,568 A | 2/1995 | Ewen et al. |
| 5,391,629 A | 2/1995 | Turner et al. |
| 5,504,172 A | 4/1996 | Imuta et al. |
| 5,539,021 A | 7/1996 | Pate et al. |
| 5,545,504 A | 8/1996 | Koeshkerian et al. |
| 5,574,091 A | 11/1996 | Walther et al. |
| 5,677,383 A | 10/1997 | Chum et al. |
| 5,721,025 A | 2/1998 | Falla et al. |
| 5,756,659 A | 5/1998 | Hughes et al. |
| 5,798,410 A | 8/1998 | Walther et al. |
| 5,844,045 A | 12/1998 | Kolthammer et al. |
| 5,869,575 A | 2/1999 | Kolthammer et al. |
| 5,874,139 A | 2/1999 | Bosiers et al. |
| 5,879,768 A | 3/1999 | Falla et al. |
| 5,938,437 A | 8/1999 | DeVincenzo |
| 5,942,579 A | 8/1999 | Falla et al. |
| 6,106,822 A | 8/2000 | Rademacher et al. |
| 6,111,023 A | 8/2000 | Chum et al. |
| 6,117,465 A | 9/2000 | Falla et al. |
| 6,130,266 A | 10/2000 | Mihayashi et al. |
| 6,221,191 B1 | 4/2001 | Davis et al. |
| 6,235,143 B1 | 5/2001 | Crighton et al. |
| 6,316,549 B1 | 11/2001 | Chum et al. |
| 6,339,123 B1 | 1/2002 | Raetzsch et al. |
| 6,448,341 B1 | 9/2002 | Kolthmmer et al. |
| 6,448,621 B1 | 9/2002 | Thakur |
| 6,455,636 B2 | 9/2002 | Sanada et al. |
| 6,525,157 B2 | 2/2003 | Cozewith |
| 6,538,070 B1 | 3/2003 | Cardwell et al. |
| 6,566,446 B1 | 5/2003 | Parikh et al. |
| 6,767,956 B2 | 7/2004 | Choudhery et al. |
| 6,777,096 B2 | 8/2004 | Shiba et al. |
| 6,960,635 B2 | 11/2005 | Stevens et al. |
| 7,659,356 B2 * | 2/2010 | Ashihara et al. ............ 526/351 |
| 7,803,865 B2 | 9/2010 | Moncla et al. |
| 7,947,776 B2 | 5/2011 | Moncla et al. |
| 8,063,128 B2 | 11/2011 | Moncla et al. |
| 8,158,711 B2 | 4/2012 | Moncla et al. |
| 8,779,053 B2 * | 7/2014 | Lundgard et al. ............ 524/523 |
| 2001/0011118 A1 | 8/2001 | Sanada |
| 2002/0146509 A1 | 10/2002 | Kodokian et al. |
| 2003/0157354 A1 | 8/2003 | Van Veghal et al. |
| 2003/0158341 A1 | 8/2003 | Walton |
| 2003/0191231 A1 | 10/2003 | Martin et al. |
| 2003/0204017 A1 | 10/2003 | Stevens et al. |
| 2004/0024094 A1 | 2/2004 | Stemmler |
| 2004/0027593 A1 | 2/2004 | Wilkins |
| 2004/0242784 A1 | 12/2004 | Tau et al. |
| 2005/0100754 A1 | 5/2005 | Moncla et al. |
| 2005/0271888 A1 | 12/2005 | Moncla et al. |
| 2006/0211781 A1 | 9/2006 | Strandburg et al. |
| 2008/0161487 A1 | 7/2008 | Dorr et al. |
| 2010/0143837 A1 | 6/2010 | Klier et al. |

FOREIGN PATENT DOCUMENTS

| | | |
|---|---|---|
| EP | 0277004 | 8/1988 |
| EP | 0359045 | 3/1990 |
| EP | 0426637 | 5/1991 |
| EP | 0427697 | 5/1991 |
| EP | 0495375 | 7/1992 |
| EP | 0520732 | 12/1992 |
| EP | 0525205 | 2/1993 |
| EP | 0573403 | 12/1993 |
| EP | 0696244 | 2/1996 |
| EP | 1718318 | 6/1996 |
| EP | 0760828 | 3/1997 |
| EP | 0972794 | 1/2000 |
| EP | 1035166 | 9/2000 |
| EP | 1193282 | 4/2002 |
| EP | 1245603 | 10/2002 |
| EP | 1312654 | 5/2003 |
| EP | 1394202 | 3/2004 |
| JP | 02-26631 | 1/1990 |
| JP | 05-105791 | 4/1993 |
| JP | 2002047444 | 2/2002 |
| JP | 2008239691 | 10/2008 |
| WO | 9200333 | 1/1992 |
| WO | 9523038 | 8/1995 |
| WO | 0001745 | 1/2000 |
| WO | 0164774 | 9/2001 |
| WO | 0206275 | 1/2002 |
| WO | 02062875 | 8/2002 |
| WO | 02064856 | 8/2002 |
| WO | 02081205 | 10/2002 |
| WO | 02083753 | 10/2002 |
| WO | 03025058 | 3/2003 |
| WO | 03027170 | 4/2003 |
| WO | 03040201 | 5/2003 |
| WO | 03093355 | 11/2003 |
| WO | 2005021622 | 3/2005 |
| WO | 2005026275 | 3/2005 |
| WO | 2005090427 | 9/2005 |

OTHER PUBLICATIONS

Scholte, et al. "Mark-Houwink Equation and GPC Calibration for Linear Short-Chain Branched Polyolefins, Including Polypropylene and Ethylene-Propylene Copolymers", Journal of Applied Science, vol. 29, 1984, pp. 3763-3782.

Otocka, et al. "Distribution of Long and Short Branches in Low Density Polyethylenes", Macromolecules, vol. 4, No. 4, 1971, pp. 507-512.

International Search Report from related PCT Application PCT/US2011/026878 dated Oct. 25, 2011, 4 pages.

Wicks, et al. "Organic Coatings" Science and Technology, 2nd edition, 1999, pp. 246-257.

Jenkins, et al. Multi-Layer Films, Packaging Foods with Plastics, 1991, pp. 19-27.

Butler, "Coextrusion", Coextrusion Basics, 1992, Chapter 4, pp. 31-80.

Williams, et al. "The Construction of a Polyethylene calibration Curve for Gel Permeation Chromatography using Polystyrene Fractions", Journal of Polymer Science, Polymer Letters, vol. 6, 1968, pp. 621-624.

Wild, et al. "Determination of Branching Distributions in Polyethylene and Ethylene Copolymers", Journal of Polymer Science, vol. 20, 1982, pp. 441-455.

Houben-Weyl, "Methoden der Organischen Chemie, Band E20", Makromolekulare Soffe, Polyester, 1987, pp. 1405-1429.

* cited by examiner

COATING COMPOSITIONS

CROSS-REFERENCE TO RELATED APPLICATIONS

This application claims the benefit of U.S. Provisional Application Ser. No. 61/729,014 filed Nov. 21, 2012, and is a Continuation In Part of application Ser. No. 13/039,138, filed on Mar. 2, 2011, issued as U.S. Pat. No. 8,349,929, which is a Continuation In Part of application Ser. No. 12/559,056 filed Sep. 14, 2009 and issued as U.S. Pat. No. 8,063,128 on Nov. 22, 2011, which is a Continuation of application Ser. No. 10/925,693 filed Aug. 25, 2004 and issued as U.S. Pat. No. 7,803,865 on Sep. 28, 2010, which claims the benefit of Provisional Application Ser. No. 60/548,493 filed Feb. 27, 2004, which claims the benefit of Provisional Application Ser. No. 60/497,527 filed Aug. 25, 2003, the entire contents of which are incorporated herein by reference in its entirety.

FIELD OF DISCLOSURE

Embodiments of the present disclosure are directed to coating compositions, more specifically, embodiments are coating compositions that include an abrasion reducing composition.

BACKGROUND

Coating compositions can be applied to substrates and be cured, e.g. crosslinked, to provide a coating on the substrate. There are various coating compositions utilized to provide differing coatings. Coatings can be utilized to provide protection of the substrate, provide a base for a subsequent application such as a decorative coating, reduce friction to help provide for improved handling, and provide protection for contents stored within a container formed from the coated substrate, among others.

Some substrates, e.g., metal substrates, can be formed into containers, such as food and/or beverage containers. Coating compositions can be applied to the substrates and/or to the interior and/or the exterior of these containers.

SUMMARY

The present disclosure provides coating compositions from comprising from 50 to 85 percent of an aqueous dispersion based on a total weight of the coating composition; an abrasion reducing composition; a solvent; a basic water composition; and a crosslinker.

The present disclosure provides coated articles comprising a substrate and a coating on the substrate, wherein the coating includes the coating composition.

The present disclosure provides coated articles comprising a substrate and a cured coating on the substrate, wherein the cured coating is formed by curing the coating composition.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Coating compositions are described herein. These coating compositions can include an aqueous dispersion and an abrasion reducing composition. Other compositions that include an aqueous dispersion, e.g. some compositions that are employed for beverage end can coatings, utilize a lubricant. Examples of these lubricants include, but are not limited to, polytetrafluoroethylene, polydimethylsiloxane, and some hydroxy functional polysiloxanes. The lubricant may be utilized to provide a coefficient of friction that is desirable for some uses, including can coatings. For example, a coating having a coefficient of friction that is too high for a particular use may cause fouling and/or sticking of equipment employed for that particular use. However, use of lubricants with some other compositions can promote a non-continuous cured coating and/or a cured coating having a coefficient of friction that is too high for some coating applications. Surprisingly, it has been found that the coating compositions disclosed herein, which include an abrasion reducing composition, are able to provide a continuous cured coating with a desirable coefficient of friction, e.g., that may be characterized by a reduced abrasion value as compared to some other coatings.

Embodiments of the present disclosure provide coating compositions that comprise an aqueous dispersion including a melt blending product of (a) a base polymer comprising at least one polyolefin, (b) a stabilizing agent, and (c) a compatibilizer.

As mentioned, embodiments of the present disclosure provide that the aqueous dispersion can include (a) a base polymer comprising at least one polyolefin. Examples of the polyolefin include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as can be represented by ethylene-butadiene copolymer and ethylene-ethylidene norbornene copolymer; and polyolefins (including elastomers) such as copolymers of two or more alpha-olefins with a conjugated or non-conjugated diene, as can be represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer.

According to a number of embodiments of the present disclosure, one or more of the polyolefins may be functionalized polyolefins, such as polypropylene or polyethylene homopolymer or copolymer where the polymer has been modified with a hydroxyl, an amine, an aldehyde, an epoxide, an ethoxylate, a carboxylic acid, an ester, an anhydride group, or combinations thereof. Some of these functionalized polyolefins, such as polypropylene or polyethylene homopolymers or copolymers, are available, for example, from Baker Petrolite, a subsidiary of Baker Hughes, Inc.

The polyolefin may have different molecular weights for various applications. For example, the polyolefin may have a molecular weight of greater than 800 grams/mole; for example, greater than 5,000 grams/mole; or in the alternative, greater than 50,000 grams/mole. The polyolefin may have different crystalline melting points for various applications.

For example, the polyolefin may have a crystalline melting point of greater than 60° C.; greater than 95° C.; greater than 100° C.; greater than 120° C.; greater than 130° C.

According to a number of embodiments of the present disclosure the polyolefin may be a propylene-alpha olefin copolymer, for example, propylene-ethylene or a propylene-ethylene-butene copolymer or interpolymer. The polyolefin may be a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The polyolefin, e.g., the propylene/alpha-olefin copolymer, may have a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the polyolefin may have a crystallinity in the range of from at least 1 percent by weight (a heat of fusion of at least 2 Joules/gram) to 24 percent by weight (a heat of fusion of less than 40 Joules/gram); or in the alternative, the polyolefin may have a crystallinity in the range of from at least 1 percent by weight (a heat of fusion of at least 2 Joules/gram) to 15 percent by weight (a heat of fusion of less than 24.8 Joules/gram); or in the alternative, the polyolefin may have a crystallinity in the range of from at least 1 percent by weight (a heat of fusion of at least 2 Joules/gram) to 7 percent by weight (a heat of fusion of less than 11 Joules/gram); or in the alternative, the polyolefin may have a crystallinity in the range of from at least 1 percent by weight (a heat of fusion of at least 2 Joules/gram) to 5 percent by weight (a heat of fusion of less than 8.3 Joules/gram). The crystallinity can be measured via a Differential scanning calorimetry (DSC) method. Embodiments provide that the propylene/alpha-olefin copolymer can include units derived from propylene and polymeric units derived from one or more alpha-olefin comonomers. Examples of comonomers that can be utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins. The propylene/alpha-olefin copolymer can include from 1 to 40 percent by weight of units derived from one or more alpha-olefin comonomers. All individual values and subranges from 1 to 40 weight percent are included herein and disclosed herein; for example, the weight percent of units derived from one or more alpha-olefin comonomers can be from a lower limit of 1, 3, 4, 5, 7, or 9 weight percent to an upper limit of 40, 35, 30, 27, 20, 15, 12, or 9 weight percent. For example, the propylene/alpha-olefin copolymer comprises from 1 to 35 percent by weight of units derived from one or more alpha-olefin comonomers; or in the alternative, the propylene/alpha-olefin copolymer comprises from 1 to 30 percent by weight of units derived from one or more alpha-olefin comonomers; or in the alternative, the propylene/alpha-olefin copolymer comprises from 3 to 27 percent by weight of units derived from one or more alpha-olefin comonomers; or in the alternative, the propylene/alpha-olefin copolymer comprises from 3 to 20 percent by weight of units derived from one or more alpha-olefin comonomers; or in the alternative, the propylene/alpha-olefin copolymer comprises from 3 to 15 percent by weight of units derived from one or more alpha-olefin comonomers.

The propylene/alpha-olefin copolymer can have a molecular weight distribution (MWD), defined as weight average molecular weight divided by number average molecular weight ($M_w/M_n$) of 3.5 or less; in the alternative 3.0 or less; or in another alternative from 1.8 to 3.0. Such propylene/alpha-olefin copolymers are further described in U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In a number of embodiments of the present disclosure, the propylene/alpha-olefin copolymers are further characterized as including (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ $\alpha$-olefin; and containing an average of at least 0.001, preferably an average of at least 0.005 and more preferably an average of at least 0.01, long chain branches/1000 total carbons, wherein the term long chain branch, as used herein, refers to a chain length of at least one carbon more than a short chain branch, and short chain branch, as used herein, refers to a chain length of two carbons less than the number of carbons in the comonomer. For example, a propylene/1-octene interpolymer has backbones with long chain branches of at least seven carbons in length, but these backbones also have short chain branches of only six carbons in length. In a number of embodiments, the maximum number of long chain branches does not exceed 3 long chain branches/1000 total carbons. Such propylene/alpha-olefin copolymers are further described in U.S. Provisional Patent Application No. 60/988,999 and International Patent Application No. PCT/US08/082,599, each of which is incorporated herein by reference.

Embodiments of the present disclosure provide that the aqueous dispersion can include (b) a stabilizing agent. The stabilizing agent can help to promote formation of a stable dispersion, e.g., the aqueous dispersion.

Embodiments provide that the stabilizing agent include a surfactant, a polymer, or a combination thereof. For example, the stabilizing agent can be a polar polymer, e.g., including a polar group as either a comonomer or grafted monomer. In some embodiments, the stabilizing agent can include one or more polar polyolefins, e.g., having a polar group as either a comonomer or grafted monomer.

Examples of polymeric stabilizing agents include, but are not limited to, ethylene-acrylic acid and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other examples of polymeric stabilizing agents include, but are not limited to, ethylene ethyl acrylate copolymer, ethylene methyl methacrylate, ethylene butyl acrylate, and combinations thereof. Other ethylene-carboxylic acid copolymer may also be used. Those having ordinary skill in the art will recognize that a number of other useful polymers may also be used.

In some embodiments, the stabilizing agent can include a functionalized polyolefin, e.g., a polypropylene or polyethylene homopolymer or copolymer in which the polymer has been modified with a hydroxyl, an amine, an aldehyde, an epoxide, an ethoxylate, a carboxylic acid, an ester, an anhydride group, or combinations thereof. Some of functionalized polyolefins such as polypropylene or polyethylene homopolymers and copolymers are available, for example, from Baker Petrolite, a subsidiary of Baker Hughes, Inc.

In some embodiments, the stabilizing agent can include long chain fatty acids, fatty acid salts, or fatty acid alkyl esters having from 12 to 60 carbon atoms. In other embodiments, the long chain fatty acid or fatty acid salt may have from 12 to 40 carbon atoms.

As mentioned, the stabilizing agent can include a surfactant. Examples of the surfactant include, but are not limited to, cationic surfactants, anionic surfactants, non-ionic surfactants, and combinations thereof. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants.

The stabilizing agent can include an external surfactant and/or an internal surfactant, for example. External surfactants are surfactants that do not become chemically reacted into the polyolefin during dispersion preparation. Examples of external surfactants include, but are not limited to, salts of dodecyl benzene sulfonic acid and lauryl sulfonic acid salt. Internal surfactants are surfactants that do become chemically reacted into the polyolefin during dispersion preparation.

Examples of commercially available surfactants include, but are not limited to: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

The stabilizing agent can include solution or suspension polymers, e.g., polymers of ethylenically unsaturated monomers such as acrylic and/or methacrylic acid and their ($C_1$-$C_{30}$) esters or amides; acrylamide/methacrylamide and their N-substituted derivatives; acrylonitrile; styrene and substituted styrene derivatives.

The stabilizing agent can include a polymeric stabilizing agent. Examples of polymeric stabilizing agents include, but are not limited to, amphiphilic copolymer compositions, the copolymer including the reaction product of from 5 weight percent to 95 weight percent of one or more hydrophilic monomers and from 5 weight percent to 95 weight percent of one or more copolymerizable ethylenically unsaturated hydrophobic monomers. These materials are water soluble and/or emulsifiable, for example upon neutralization and can act as colloidal stabilizers.

Examples of nonionic monomers useful for production of amphiphilic copolymer compositions, include, but are not limited to, acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, t-butylacrylamide, N methylolacrylamide, alkyl(meth)acrylates such as methyl(meth)acrylate, butyl acrylate and ethylacrylate, vinyl monomers such as ethylene, styrene, divinylbenzene, di-isobutylethylene, vinyl acetate and N-vinyl pyrrolidone, and allyl monomers such as allyl (meth)acrylate.

Examples of monomers useful for production of amphiphilic copolymer compositions include, but are not limited to, unsaturated amide functionalized monomers such as acrylamide, methacrylamide, N,N-dimethylacrylamide, N,N-diethylacrylamide, N-isopropylacrylamide, N-vinylformamide, N-vinylmethylacetamide, N-vinyl pyrrolidone, t-butylacrylamide, and N-methylolacrylamide; monomers containing quaternary ammonium salts such as tributylammonium ethyl(meth)acrylate chloride, diallyldimethylammonium chloride, methylacrylamidopropyltrimethylammonium chloride, acrylamidopropyltrimethylammonium chloride, polyquaternium-11 and polyquaternium-4; and amine functionalized monomers such as vinylimidazole.

"Anionic" or "acid-containing monomer" useful for production of amphiphilic copolymer compositions include, but are not limited to, ethylenically unsaturated monomers containing carboxylic acid, phosphonic acid, phosphinic acid, sulfinic acid, sulfonic acid groups, and anhydrides that are subsequently hydrolyzed. Suitable examples include (meth) acrylic acid, maleic acid, fumaric acid, itaconic acid, vinyl phosphonic acid, phosphoethyl (meth)acrylate, and vinylsulfonic acid.

According to a number of embodiments, one or more of the stabilizing agents may be based on resins such as polyester, epoxy resins, polyamide resins, which might be reacted with acrylic resins or acrylic monomers to form polyester acrylate, polyamide acrylates epoxy resin acrylates.

Polyester resins useful for producing stabilizing agents may be obtained in accordance with conventional procedures well known to those of ordinary skill in the art by reacting, for example, a polybasic acid that contains at least two carboxyl groups per polybasic acid molecule (e.g. an at least dibasic polycarboxylic acid) with a polyhydric alcohol that contains at least two hydroxyl groups in the polyhydric alcohol (e.g., at least dihydric alcohol) in presence of a conventional esterification catalyst at an elevated temperature with or without solvent present. Alternatively alkyl esters of the polycarboxylic acids or anhydrides of polycarboxylic acids can be reacted in presence of a conventional esterification catalyst at an elevated temperature. One or more polymerizable double bonds may be included into the polyester by employing a polybasic acid that contains polymerizable double bonds and/or a polyhydric alcohol that contains polymerizable double bonds.

The stabilizing agent may include a polyester acrylate. Polyester acrylates may be formed via in-situ polymerization of copolymerizable ethylenically unsaturated monomers in presence of polyesters. Examples include ethylenically unsaturated mono- or polyfunctional acids, ethylenically unsaturated mono- or polyfunctional acid esters, amides, nitriles as well as vinyl monomers and vinyl ester with a polyester in or without presence of a reaction fluid. Polyester acrylates in solvents can be dried according to suitable methods known to those of ordinary skill in the art.

The stabilizing agent may include an epoxy resin. Epoxy resins may be obtained in accordance with conventional procedures well known to those of ordinary skill in the art, e.g., by reacting a polyepoxide with a suitable polynucleophile. Suitable epoxides include, but are not limited to, glycidyl ethers, and other epoxy group containing molecules. Suitable polynucleophiles include, but are not limited to, polyhydric phenols, and poly phenols, polythiols, aliphatic polyalcohols or polybasic acids or polyamines. Examples of epoxies include, but are not limited to, glycidyl ether that contains at least two glycidyl ether groups per polyglycidyl ether molecule (e.g. an at least diglycidyl ether) with a polyhydric phenol that contains at least two hydroxyl groups in the polyhydric polyphenol (e.g., at least dihydric phenol or a diphenol) in presence of a conventional catalyst at an elevated temperature with or without solvent present. Other epoxy resins may be obtained in accordance with conventional procedures well known to those of ordinary skill in the art by reacting, for example, a polyglycidyl ether that contains at least two glycidyl ether groups per polyglycidyl ether molecule (e.g. an at least diglycidyl ether) with a polybasic acid that contains at least two carboxyl groups per polybasic acid molecule (e.g. an at least dibasic polycarboxylic acid) in presence of a conventional catalyst at an elevated temperature with or without solvent present.

The stabilizing agent may include an epoxy acrylate. The epoxy acrylates may be formed via in-situ polymerization of copolymerizable ethylenically unsaturated monomers in presence of epoxy resins. Examples include, but are not limited to, ethylenically unsaturated mono- or polyfunctional acids, ethylenically unsaturated mono- or polyfunctional acid esters, amides, nitriles as well as vinyl monomers and vinyl ester with an epoxy resins in or without presence of a reaction fluid. Alternatively a polymeric acid functional acrylic resin can be reacted with an epoxy resin in the presence of a suitable catalyst to form epoxy acrylate. Epoxy acrylates in solvents can be dried according to suitable methods known to those of ordinary skill in the art.

Embodiments of the present disclosure provide that the aqueous dispersion can include (c) a compatibilizer. The compatibilizer can help in formation of the aqueous dispersion, e.g., help provide a more uniform dispersion, and/or improve properties of a cured coating composition. Compatibilizers may also be referred to as coupling agents.

The compatibilizer can include a modified, e.g., functionalized, polymer and optionally a low molecular weight compound having reactive polar groups. Examples of the compatibilizer include, but are not limited to modified olefin polymers. The modified olefin polymers can include graft copolymers and/or block copolymers, such as propylene-maleic anhydride graft copolymer. Examples of groups that can modify the polymer include, but are not limited to, acid anhydrides, carboxylic acids, carboxylic acid derivatives, primary and secondary amines, hydroxyl compounds, oxazoline and epoxides, and ionic compounds, and combinations thereof. Specific examples of the groups that can modify the polymer include, but are not limited to, unsaturated cyclic anhydrides and their aliphatic diesters, and the diacid derivatives. For example, maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid, and combinations thereof. Commercially available examples of compatibilizers include, but are not limited to, polymers available, under the trade names LICOCENE® from Clariant Corporation, such as LICOCENE® 6452, which is a propylene-maleic anhydride graft copolymer; EXXELOR™ from ExxonMobil Chemical Company; and Epolene from Westlake Chemical Company.

The aqueous dispersion includes a fluid medium, e.g., water.

The aqueous dispersion can comprise 30 weight percent to 85 weight percent of water based on a total weight of the aqueous dispersion; for example the aqueous dispersion can comprise 35 weight percent to 80 weight percent, 40 weight percent to 75 weight percent, or 45 weight percent to 70 weight percent of water based on a total weight of the aqueous dispersion.

Accordingly, the aqueous dispersion can comprise a solids content that is 15 weight percent to 70 weight percent based on the total weight of the aqueous dispersion; for example the aqueous dispersion can have solids content that is 20 weight percent to 68 weight percent, 25 weight percent to 65 weight percent, or 30 weight percent to 60 weight percent based on the total weight of the aqueous dispersion.

The solids content of the aqueous dispersion can comprise 50 to 85 percent by weight of the base polymer based on a total weight of the solids content; for example the solids content of the aqueous dispersion can comprise 55 to 80 percent, or 60 to 80 percent by weight of the base polymer based on the total weight of the solids content.

The solids content of the aqueous dispersion can comprise 10 to 35 percent by weight of the stabilizing agent based on the total weight of the solids content; for example the solids content of the aqueous dispersion can comprise 12 to 33 percent, or 15 to 30 percent by weight of the stabilizing agent based on the total weight of the solids content.

The solids content of the aqueous dispersion can comprise 2 to 15 percent by weight of the compatibilizer based on the total weight of the solids content; for example the solids content of the aqueous dispersion can comprise 3 to 13 percent, or 5 to 10 percent by weight of the compatibilizer based on the total weight of the solids content.

The aqueous dispersion can be from 50 to 85 weight percent of the coating composition based on a total weight of the coating composition; for example the aqueous dispersion can be 55 to 80 weight percent, or 60 to 75 weight percent of the coating composition based on the total weight of the coating composition.

According to a number of embodiments of the present disclosure, the aqueous dispersion can comprise a base, e.g., such that the aqueous dispersion has a pH in a range from 8 to 11. All individual values and subranges from 8 to 11 are included herein and disclosed herein; for example, the aqueous dispersion can have a pH from a lower limit of 8, 8.1, 8.2, or 8.3 to an upper limit of 11, 10.9, 10.8, or 10.7. For example, the aqueous dispersion can have a pH from 8 to 11, 8.1 to 10.9, 8.2 to 10.8, or 8.3 to 10.7. Examples of the base include, but are not limited to, hydroxides, carbonates, amines, and combinations thereof. Examples of hydroxides include, but are not limited to, ammonium hydroxide, potassium hydroxide, lithium hydroxide, and sodium hydroxide. Examples of carbonates include, but are not limited to sodium carbonate, sodium bicarbonate, potassium carbonate, and calcium carbonate. Examples of amines include, but are not limited to monoethanolamine, diethanolamine, triethanolamine, ammonia, monomethylamine, dimethylamine, trimethylamine, 2-amino-2-methyl-1-propanol, triisopropanolamine, diisopropanolamine, N,N-dimethylethanolamine, mono-n- propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl)ethylenediamine, 1,2-diaminopropane, 2-amino-2-hydroxymethyl-1,3-propanediol, N,N'-ethylenebis[bis(2-hydroxypropyl)amine]toluene-p-sulphonate, and combinations thereof.

The aqueous dispersions can be formed by various processes recognized by those having skill in the art. Embodiments provide that one or more base polymers, one or more stabilizing agents, and one or more compatibilizers are melt-kneaded in an extruder, e.g. via a BLUEWAVE™ process, to form a melt blending product. Water and a neutralizing agent, such as ammonia, potassium hydroxide, or a combination thereof can be utilized to form an aqueous dispersion, e.g., an aqueous polyolefin dispersion. In a number of embodiments, the aqueous dispersion is first diluted to contain about 1 to about 3% by weight water and then, subsequently, further diluted to comprise greater than about 25% by weight water.

Various melt-kneading processes known in the art may be used. In some embodiments, a kneader, a BANBURY® mixer, single-screw extruder, or a multi-screw extruder, e.g. a twin screw extruder, may be utilized. A process for producing the aqueous dispersions in accordance with the present disclosure is not particularly limited. For example, an extruder, in certain embodiments, for example, a twin screw extruder, is coupled to a back pressure regulator, melt pump, or gear pump. Embodiments also provide a base reservoir and an initial water reservoir, each of which includes a pump. Desired amounts of base and initial water can be provided from the base reservoir and the initial water reservoir, respectively. Various suitable pumps may be used, but in some embodiments, for example, a pump that provides a flow of about 150 cc/min at a pressure of 240 bar can be used to provide the base and the initial water to the extruder. In other embodiments, a liquid injection pump provides a flow of 300 cc/min at 200 bar or 600 cc/min at 133 bar. In some embodiments, the base and initial water are preheated in a preheater. For example, in a number of embodiments, one or more base polymers, e.g., in the form of pellets, powder, or flakes, can be fed from the feeder to an inlet of an extruder where the polymers are melted. In some embodiments, a dispersing agent can be added to the one or more base polymers through and along with the resin and in other embodiments, the dispersing agent can be provided separately to the extruder. The melted polymers can then be delivered from the mix and convey zone to an emulsification zone of the extruder where an initial amount of water and/or base from the water and base reservoirs can be added through an inlet. In some embodiments, a dispersing agent may be added additionally or exclusively to the water stream. In some embodiments, further dilution water may be added via water inlet from a water reservoir to a dilution and cooling zone of the extruder. The aqueous dispersion can be diluted, e.g., to at least 30 weight percent water, in the cooling zone. Further dilution may occur a number of times until the desired dilution level is achieved. In some embodiments, water is not added into the twin screw extruder but rather to a stream containing the melt product after the melt product has exited from the extruder. In this manner, steam pressure build-up in the extruder is eliminated and the aqueous dispersion is formed in a secondary mixing device such as a rotor stator mixer.

In one or more embodiments, a process for producing the aqueous dispersion comprises the steps of (1) selecting one or more base polymers; (2) selecting one or more stabilizing agents; (3) selecting one or more compatibilizers; (4) selecting a liquid media comprising water; (5) optionally selecting one or more neutralizing agents; (6) melt-blending the one or more base polymers, one or more stabilizing agents, and the one or more compatibilizers in the presence of water and optionally one or more neutralizing agents; (6) thereby forming an emulsified mixture; (7) contacting the emulsified mixture with additional dilution water while optionally removing heat therefrom; (8) thereby forming solid particles dispersed in the water; and (9) thereby forming the aqueous dispersion.

The aqueous dispersion can have an average volume particle size diameter in the range of from 400 to 1500 nanometers (nm). All individual values and subranges from 400 to 1500 nm are included herein and disclosed herein; for example, the aqueous dispersion can have an average volume particle size diameter from a lower limit of 400, 425, or 450 nm to an upper limit of 1500, 1475, or 1450 nm. For example, the aqueous dispersion can have an average volume particle size diameter from 400 to 1500 nm, 425 to 1475 nm, or 450 to 1450 nm.

Embodiments of the present disclosure provide that the coating compositions disclosed herein can be formed by combining the aqueous dispersion with other components to form the coating compositions. The aqueous dispersion and other components of the coating compositions, discussed further herein, can be combined by various processes. For example, the aqueous dispersion and other components of the coating compositions can be mixed manually, by utilizing a mixer such static mixer, also referred as in-line mixers, and/or by utilizing an agitated vessel, such as an agitated tank to form the coating compositions disclosed herein, among other processes.

As mentioned, the coating compositions disclosed herein comprise an abrasion reducing composition. Embodiments provide that the abrasion reducing composition comprises a wax that is from 0.01 weight percent to 1.5 weight percent of the coating composition based on the total weight of the coating composition. All individual values and subranges from and including 0.01 weight percent to 1.5 weight percent of the coating composition based on the total weight of the coating composition are included herein and disclosed herein; for example, the wax may be in a range with a lower limit of 0.01, 0.10, or 0.25 weight percent of the coating composition based on the total weight of the coating composition to an upper limit of 1.5 weight percent, 1.25 weight percent, or 1.0 weight percent of the coating composition based on the total weight of the coating composition. The wax may be utilized neat, e.g., the wax may be directly added to the coating compositions, or as component of a blend, such as a mixture or a dispersion that may be added to the coating compositions, for example. A number of embodiments of the present disclosure provide that the aqueous dispersion can comprise the wax, e.g., the wax, or a portion of the wax, can be a component of the aqueous dispersion.

Embodiments of the present disclosure provide that the wax can comprise Fischer-Tropsch wax, carnauba wax, or a combination thereof. Fischer-Tropsch wax is synthetic wax that is generated from the known Fischer-Tropsch synthesis in which either coal or natural gas derived carbon monoxide is combined with hydrogen to produce hydrocarbons, followed by polymerization to produce the Fischer-Tropsch wax. The Fischer-Tropsch wax can have a molar mass of from 300 to 2000 grams/mole. All individual values and subranges from and including 300 to 2000 grams/mole are included herein and disclosed herein; for example, the Fischer-Tropsch wax may have molar mass in a range with a lower limit of 300, 325, or 350 grams/mole to an upper limit of 2000, 1950, or 1900 grams/mole. The Fischer-Tropsch wax can have a melting point from 90° C. to 110° C. All individual values and subranges from and including 90° C. to 110° C. are included herein and disclosed herein; for example, the Fischer-Tropsch wax may have melting point in a range with a lower limit of 90° C., 91° C., or 92° C. to an upper limit of 110° C., 109° C. or 108° C. An example of commercially available Fischer-Tropsch wax includes SLIP-AYD® SL 404, available from Elementis.

Carnauba wax is a natural vegetable wax. An example of commercially available carnauba wax includes AQUACER® 1547, available from BYK.

Embodiments of the present disclosure provide that the abrasion reducing composition comprises a hydroxy functional polysiloxane. The hydroxy functional polysiloxane can be from 0.01 weight percent to 0.10 weight percent of the coating composition based on the total weight of the coating composition. All individual values and subranges from and including 0.01 weight percent to 0.10 weight percent of the coating composition based on the total weight of the coating composition are included herein and disclosed herein; for example, the hydroxy functional polysiloxane may be in a range with a lower limit of 0.01, 0.02, or 0.03 weight percent of the coating composition based on the total weight of the coating composition to an upper limit of 0.10 weight percent, 0.09 weight percent, or 0.08 weight percent of the coating composition based on the total weight of the coating composition.

The hydroxy functional polysiloxane can have a hydroxyl equivalent weight of 500 to 2000 grams per hydroxyl equivalent. All individual values and subranges from and including 500 grams per hydroxyl equivalent to 2000 grams per hydroxyl equivalent are included herein and disclosed herein; for example, the hydroxy functional polysiloxane may have a hydroxyl equivalent weight in a range with a lower limit of 500, 750 or 1000 grams per hydroxyl equivalent to an upper limit of 2000, 1750 or 1500 grams per hydroxyl equivalent.

The hydroxy functional polysiloxane can comprise a polyether modified hydroxy functional polysiloxane, a polyester modified hydroxy functional polysiloxane, and/or a polyether-polyester modified hydroxy functional polysiloxane.

A number of embodiments of the present disclosure provide that the polyether modified hydroxy functional polysiloxane can be represented by the following formula I:

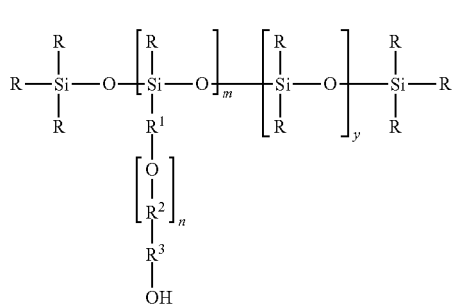

Formula I where each R group is independently $C_1$-$C_{20}$ alkyl group or a $C_1$-$C_{20}$ aryl group; $R^1$ is a $C_1$-$C_{20}$ bridging group; $R^2$ is $((C(R^4)(R^5))_x$; $R^3$ is $((C(R^6)(R^7))_z$; $R^4$, $R^5$, $R^6$, and $R^7$ each are independently selected from hydrogen and a $C_1$-$C_6$ alkyl group; m is from 1 to 25; n is from 1 to 20; y is from 1 to 500; x is from 1 to 4; and z is from 0 to 4. Examples of the $C_1$-$C_{20}$ bridging group include, but are not limited to, methylene and higher alkylene groups.

The polyether modified hydroxy functional polysiloxane can comprise a linear or branched polysiloxane that is modified by one more polyether groups attached through silicon-carbon bonds or silicone-oxygen-carbon bonds, for example. Examples of the polyether include polyethylene oxide, polypropylene oxide, and combinations thereof. Examples of the polyether modified hydroxy functional polysiloxane include, but are not limited to, those commercially available from Evonik under the product name TEGO® Glide 440 polyether-modified polysiloxane, TEGO® Glide 410 polyether-modified polysiloxane, and TEGO® Glide 425 polyether-modified polysiloxane, among others.

A number of embodiments of the present disclosure provide that the polyester modified hydroxy functional polysiloxane can be represented by the following formula II:

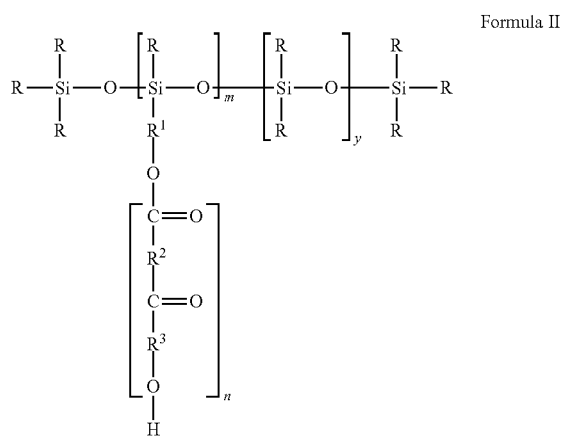

Formula II where each R group is independently $C_1$-$C_{20}$ alkyl group or a $C_1$-$C_{20}$ aryl group; $R^1$ is a $C_1$-$C_{20}$ bridging group; $R^2$ and $R^3$ are each independently a $C_2$-$C_6$ alkylene or a $C_2$-$C_6$ benzene-diyl; m is form 1 to 25; n is from 1 to 20; and y is from 1 to 500. Examples of the $C_1$-$C_{20}$ bridging group include, but are not limited to, methylene and higher alkylene groups. Examples of the $C_2$-$C_6$ benzene-diyl include, but are not limited to, benzene-1,2-diyl, benzene-1,3-diyl, and benzene-1,4-diyl.

The polyester modified hydroxy functional polysiloxane can comprise a linear or branched polysiloxane that is modified by one more polyester groups attached through silicon-carbon bonds or silicone-oxygen-carbon bonds, for example. Examples of the polyester include polylactic acid, polycaprolactone, and combinations thereof. Examples of the polyether modified hydroxy functional polysiloxane include, but are not limited to, those commercially available from BYK under the product name BYK®-370, among others.

A number of embodiments of the present disclosure provide that the polyether-polyester modified hydroxy functional polysiloxane can be represented by the following formula III:

Formula III

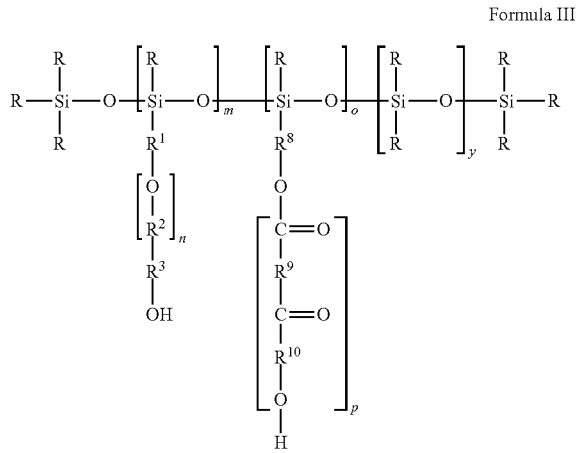

A where each R group is independently $C_1$-$C_{20}$ alkyl group or a $C_1$-$C_{20}$ aryl group; $R^1$ is a $C_1$-$C_{20}$ bridging group; $R^2$ is $((C(R^4)(R^5))_x$; $R^3$ is $((C(R^6)(R^7))_z$; $R^4$, $R^5$, $R^6$, and $R^7$ each are independently selected from hydrogen and a $C_1$-$C_6$ alkyl group; $R^8$ is a $C_1$-$C_{20}$ bridging group; $R^9$ and $R^{10}$ are each independently a $C_2$-$C_6$ alkylene or a $C_2$-$C_6$ benzene-diyl; m is from 1 to 25; n is from 1 to 20; o is from 1 to 25; p is from 1 to 20; x is from 1 to 4; y is from 1 to 500; and z is from 0 to 4. Examples of the $C_1$-$C_{20}$ bridging group include, but are not limited to, methylene and higher alkylene groups.

The polyether-polyester modified hydroxy functional polysiloxane can comprise a linear or branched polysiloxane that is modified by one more polyester groups and one or more polyether groups attached through silicon-carbon bonds or silicone-oxygen-carbon bonds, for example. Examples of the polyether include polyethylene oxide, polypropylene oxide, and combinations thereof. Examples of the polyester include polylactic acid, polycaprolactone, and combinations thereof. Examples of the polyether-polyester modified hydroxy functional polysiloxane include, but are not limited to, those commercially available from BYK under the product name BYK®-375, among others.

Embodiments of the present disclosure provide that the coating composition comprises a solvent. The solvent can be from 3 weight percent to 20 weight percent of the coating composition based on the total weight of the coating composition. All individual values and subranges from 3 weight percent to 20 weight percent of the coating composition based on the total weight of the coating composition are included herein and disclosed herein; for example, the solvent can be from a lower limit of 3, 4, or 5 weight percent of the coating composition based on the total weight of the coating composition to an upper limit of 20, 19, or 18 weight percent of the coating composition based on the total weight of the coating composition. For example, the solvent can be from 3 to 20, 4 to 19, or 5 to 18 weight percent of the coating composition based on the total weight of the coating composition. Examples of the solvent include, but are not limited to, glycol ethers, alcohols, aromatics, e.g. aromatic hydrocarbons, white spirit, branched ketones, esters, and combinations thereof. According to one or more embodiments, the solvent is selected for the group of ethylene glycol, diethylene glycol monoethyl ether, dipropylene glycol dimethyl ether, propylene glycol methyl ether, ethanol, dipropylene glycol methyl ether, and combinations thereof.

The coating compositions disclosed herein can comprise a basic water composition. The basic water composition includes a base. Examples of the base include, but are not limited to, those bases discussed herein.

The basic water composition can comprise from 90 to 99.9 percent by weight of water based on a total weight of the basic water composition. All individual values and subranges from 90 to 99.99 percent by weight of water based on a total weight of the basic water composition are included herein and disclosed herein; for example, the percent by weight of water based on a total weight of the basic water composition can be from a lower limit of 90, 90.5, 91, or 93 to an upper limit of 99.99, 99.9, 99, or 98 percent. For example, the basic water composition can comprise from 90 to 99.99, 90.5 to 99.9, 91 to 99, or 93 to 98 percent by weight of water based on a total weight of the basic water composition. The basic water composition can comprise from 0.01 to 10 percent by weight of a base based on the total weight of the basic water composition. All individual values and subranges from 0.01 to 10 percent by weight of the base based on a total weight of the basic water composition are included herein and disclosed herein; for example, the percent by weight of the base based on a total weight of the basic water composition can be from a lower limit of 0.01, 0.1, 1, or 2 to an upper limit of 10, 9.5, 9, or 7 percent. For example, the basic water composition can comprise from 0.01 to 10, 0.1 to 9.5, 1 to 9, or 2 to 7 percent by weight of the base based on a total weight of the basic water composition.

The coating compositions disclosed herein can have a pH in a range from 8 to 11. All individual values and subranges from 8 to 11 are included herein and disclosed herein; for example, the coating composition can have a pH from a lower limit of 8, 8.1, 8.2, or 8.3 to an upper limit of 11, 10.9, 10.8, or 10.7. For example, the coating composition can have a pH from 8 to 11, 8.1 to 10.9, 8.2 to 10.8, or 8.3 to 10.7.

The coating compositions disclosed herein can comprise a crosslinker. The crosslinker can be from 0.01 to 40 weight percent of the coating composition based on the total weight of the coating composition. All individual values and subranges from 0.01 to 40 weight percent are included herein and disclosed herein; for example, the crosslinker can be from a lower limit of 0.01, 0.02, or 0.1, to an upper limit of 40, 30, or 20 weight percent of the coating composition based on the total weight of the coating composition. For example, the crosslinker can from 0.01 to 40 weight percent, 0.02 to 30 weight percent, or 0.1 to 20 weight percent of the coating composition based on the total weight of the coating composition.

Embodiments of the present disclosure provide that the crosslinker may be a compound, which reacts with a reactive functional group contained in the coating composition; thereby facilitating the crosslinking between such functional groups. Such functional groups can be present in components of the aqueous dispersion, for example in (a) the base polymer, (b) the polymeric stabilizing agent, and/or (c) the compatibilizer. For example, reactive functional groups include, but are not limited to, acid groups such as carboxylic acid groups, free or in the neutralized form, or any functional groups having another active hydrogen by another component such as alcohol groups, amino groups, or the like.

Crosslinkable functional groups in the crosslinker are groups capable of reacting with the reactive functional groups of the coating compositions. For example, a carbodiimide group, an oxazoline group, an isocyanate group, a hydroxyalkylamide group, an epoxy group, a methylol group, an aldehyde group, an acid anhydride group, a hydroxy group, an aziridinyl group, and/or a silane group can be for the crosslinker.

Another possibility of crosslinking acid functional groups is by use of multivalent metal ions by reaction of the aforementioned acid groups with a multivalent metal ion containing substance, such as zinc oxide. Carboxylic acids could also be crosslinked in reactions with multifunctional olefinic unsaturated substances under catalysis of a strong acid. Multifunctional carbonates could also react with carboxylic acids to give ester linkages with liberation of carbon dioxide. Also, polyolefinic materials may be crosslinked via free radical crosslinking, initiated by addition of peroxides or via radiation, e.g., electron beam.

According to a number of embodiments the crosslinker comprises phenol-formaldehyde resins; hydroxyalkylamide resins; amino-formaldehyde resins including, but not limited to, urea-formaldehyde resins, melamine formaldehyde resins, benzoguanamine formaldehyde resins, anhydride resins; epoxy group containing resins, including, but not limited, to epoxy resins, epoxy group containing polyester or acrylic resins and blocked isocyanate resins, and combinations of two or more thereof, provided that the combinations of such crosslinkers is compatible.

The crosslinker may be a waterdispersed, waterdispersible, or water-soluble substance. According to a number of embodiments, examples of the crosslinker include, but are not limited to, an aqueous monomeric or polymeric substance, which contains two or more oxazoline groups, carbodiimide groups, hydroxyalkylamide groups, epoxy groups, isocyanate groups, methylol groups etc. or several of these per molecule.

An example of an oxazoline crosslinker is an aqueous polymer having two or more oxazoline groups in its molecules, which can be obtained by polymerizing an oxazoline group-containing monomer and, as required, an ethylenic unsaturated monomer. Alternatively an oxazoline crosslinker can also be obtained by reaction between a nitrile group and an aminoethanol group, dehydration of a hydroxylalkylamide group and the like.

Crosslinkers having two or more carbodiimide groups can be produced from diisocyanate compounds by a condensation reaction accompanied by decarboxylation reaction of a diisocyanate compound. Examples of the diisocyanate compound include, but are not limited to, 1,5-naphthylene diisocyanate, 4,4'-diphenylmethane diisocyanate, 4,4'-diphenyldimethylmethane diisocyanate, 1,4-phenylene diisocyanate, 2,4-tolylene diisocyanate, 2,6-tolylene diisocyanate, hexanemethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate and the like. These compounds may also be used as mixtures. Monofunctional isocyanates may be included, e.g., to control the resin molecular chain length, such as phenyl isocyanate, tolyl isocyanate, cyclohexylisocyanate, dimethylphenyl isocyanate, butylisocyanate, and naphthyl isocyanate are useful. Diisocyanate substances may be partially reacted with aliphatic compounds, alicyclic compounds, or aromatic compounds having a hydroxyl group, an imino group, an amino group, a carboxyl group, a mercapto group, an epoxy group, and the like. In the condensation reaction accompanied by decarboxylation of a diisocyanate compound, a carbodiimidization catalyst can be used. Usable as such a catalyst are, for example, phospholene oxides such as 1-phenyl-2-phospholene-1-oxide, 3-methyl-2-phospholene-1-oxide, 1-ethyl-2-phospholene-1-oxide, and 3-phospholene isomers thereof.

To convert a carbodiimide group-containing polymer into an aqueous polymer, a hydrophilic segment can be provided in the molecular structure of the carbodiimide group-containing polymer. For example, an aqueous polymer containing a carbodiimide group can be obtained by providing a hydrophilic segment having a functional group which has reactivity with an isocyanate group. Usable as the hydrophilic segment are: quaternary ammonium salts of dialkylamino alkylamine (e.g., quaternary ammonium salts of 2-dimethylaminoethanol); quaternary salts of dialkylamino alkylamine (e.g., 3-dimethylamino-n-propylamine); alkyl sulfonic acid salts having at least one reactive hydroxyl group (e.g., sodiumhydroxypropanesulfonate); a mixture of polyethylene oxide or polyethylene oxide, whose terminal is capped with an alkoxy group, and a polypropylene oxide (e.g., polyethylene oxide whose terminal position is capped with a methoxy group or an ethoxy group).

The crosslinker, e.g. an aqueous crosslinker, may contain an epoxy group; examples include, but are not limited to, sorbitol polyglycidyl ether, glycerol triglycidyl ether, polyglycerol polyglycidyl ether, trimethylolpropane triglycidyl ether, poly(ethyleneglycol) diglycidyl ether, poly(propyleneglycol) diglycidyl ether, phenol ethyleneoxide glycidyl ether, and lauryl alcohol ethyleneoxide glycidyl ether or the like. In addition to the above, mentioned as examples are: a water-soluble epoxy resin obtained by reacting a carboxy compound, which is obtained through a reaction between a polyoxyethylene polyol compound and an anhydride compound, and an epoxy resin having two or more epoxy groups in its molecules; and a self-emulsifiable epoxy resin composition obtained by mixing the water-soluble epoxy resin and the epoxy resin having two or more epoxy groups in its molecules. Such resins can be obtained for example under the tradenames of XZ 92533.00, XZ 92598.00, and XZ 92446.00 from The Dow Chemical Company.

Examples of the anhydride compound include, but are not limited to, aromatic anhydrides such as phthalic anhydride, trimellitic anhydride, and pyromellitic anhydride; and cyclic aliphatic anhydrides such as maleic anhydride, succinic anhdyride, tetrahydrophthalic anhydride, methyl tetrahydrophthalic anhydride, methyl nadic anhydride, alkenyl succinic anhdyride, hexahydrophthalic anhydride, and methyl hexahydrophthalic anhydride. There is no limitation on the epoxy resin having two or more epoxy groups in its molecules, and all known epoxy resins with an epoxy functionality of greater or equal to two can be used. Examples are polyglycidyl ether obtained from epichlorohydrin and a polyhydric compound such as, phenol novolac, and cresol novolac bisphenol A, bisphenol F, bisphenol S, resorcinol, hydroquinone or catechin; alkylene oxide-added bisphenol A; polyalcohols such as polypropylene glycol, 1,6-hexanediol, trimethylol propane, glycerin, cyclohexanedimethanol; and polyglycidyl ester and polyglycidyl amine of polycarboxylic acids such as adipic acid, phthalic acid, dimer acid and the like.

The crosslinker, e.g. an aqueous crosslinker, containing an isocyanate group are, for example: polyisocyanate mainly containing at least one member selected from the group consisting of an isocyanurate group-containing polyisocyanate, an urethodione group-containing polyisocyanate, an urethodione group/isocyanurate group containing polyisocyanate, an urethane group containing polyisocyanate, an allophanate group containing polyisocyanate, a biuret group containing polyisocyanate, a carbodiimide group containing polyisocyanate, and an uretodione group containing polyisocyanate, each of which contains 1,6-hexamethylene diisocyanate and/or isophorone diisocyanate as a raw material; and a self-emulsifiable polyisocyanate obtained by reacting a hydrophilic surfactant having at least one active hydrogen group which can react with an isocyanate group or polyethylene ether alcohol containing at least three poly-ethylene oxide units with fatty acid ester in which the sum of the number of carbons of fatty acid and a hydroxyl containing compound as raw materials is 8 or more and which has at least one active hydrogen group which can react with an isocyanate group. In addition to the above, an urethane group-containing polyisocyanate obtained by reaction between 1,6-hexamethylenediisocyanate and/or an isophorone diisocyanate and an active hydrogen group-containing compound or polyisocyanate obtained by an allophanatization reaction, carbodiimidization reaction, uretodionization reaction, and biuretization reaction of these diisocyanate compounds can be mentioned.

Examples of the crosslinker derived from aldehyde are water-dispersed or water-dispersible or water-soluble phenol formaldehyde resins, amino formaldehyde resins or combinations thereof.

Phenol formaldehyde crosslinkers include, but are not limited to, reaction products of aldehydes with phenols. Examples of aldehdydes include, but are not limited to, formaldehyde and acetaldehyde. Various phenols can be used such as, but not limited to, phenol, cresol, p-phenylphenol, p-tert-butylphenol, p-tert-amylphenol, cyclopentylphenol, cresylic acid, bisphenol-A, bisphenol-F, and the like, and combinations thereof. Also acid functional phenols could be used in making phenol formaldehyde resins. The crosslinkers can be unetherified or etherified with alcohols or polyols. These phenol formaldehyde resins may be soluble or self-emulsifiable in water or can be stabilized by use of colloid stabilizers such as polyvinyl alcohol.

Amino formaldehyde crosslinkers include, but are not limited to, reaction products of aldehydes with amino or amido group containing molecules. Examples of aldehydes include, but are not limited to, formaldehyde and acetaldehyde. Various amino or amido group containing molecules can be used such as, but not limited to, urea, melamine, benzoguanamine, acetoguanamine, glycoluril and the like. Suitable amino crosslinking resins include melamine-formaldehyde, urea-formaldehyde, benzoguanamine-formaldehyde, acetoguanamine-formaldehyde, glycoluril-formaldehyde resins. Also the methylol groups of an amino formaldehyde resin can be partially or fully etherified with at least one of the groups of monohydric aliphatic alcohols such as methanol and/or n-butanol. These amino formaldehyde resins may be soluble or self-emulsifiable in water or can be stabilized by use of colloid stabilizers such as polyvinyl alcohol can be used to stabilize the amino formaldehyde dispersions.

Examples of commercially available amino-formaldehyde resins which are water soluble or water dispersible and useful for the instant purpose include Cymel™ 301, Cymel™ 303, Cymel™ 370, and Cymel™ 373, from Cytec Surface Specialties. Other aldehydes used to react with the amino compound to form the resinous material are crotonic aldehyde, acrolein, or compounds which generate aldehydes, such as hexamethylene-tetramine, paraldehyde, and the like.

A number of embodiments provide that the crosslinker comprises a hydroxyalkyl amide. The crosslinkers can be water-soluble and be employed to crosslink carboxylic acid. Examples of hydroxyalkyl amides include, but are not limited to, Bis(N,N'-dihydroxyethyl)adipamide and the like. Such compounds are commercially available under the tradename of PRIMID™ crosslinker resins from EMS-PRIMID in Switzerland, for example PRIMID™ XL-522, PRIMID™ SF-4510 and PRIMID™ QM-1260.

A number of embodiments provide that one or more crosslinkers may be added to the aqueous dispersion as part of the aqueous dispersion formulation process; or in the alternative, a number of embodiments provide that one or more crosslinkers may be added to the coating composition, e.g. the crosslinker may be added to the aqueous dispersion after the dispersion formulation process.

Depending on the coating application, e.g., the type of food and/or beverage that is to be contained in a coated container, and on desired coating properties it may be beneficial to combine several crosslinkers. Also, for some coating applications some crosslinkers may be more suited than others. Some crosslinkers may not be suited for particular coating applications. Some crosslinkers may be employed with the addition of catalysts for curing. Crosslinkers can help to build thermoset networks which are indicated by higher values of MEK Double Rubs, e.g., as compared to an identical coating composition not containing the crosslinker.

Embodiments of the present disclosure provide that the coating composition can include an antioxidant. The antioxidant can be from 0.001 weight percent to 0.1 weight percent of the coating composition based on the total weight of the coating composition. All individual values and subranges from 0.001 to 0.1 weight percent are included herein and disclosed herein; for example, the antioxidant can be from a lower limit of 0.001, 0.002, or 0.005, to an upper limit of 0.1, 0.09, or 0.07 weight percent of the coating composition based on the total weight of the coating composition. For example, the antioxidant can from 0.001 to 0.1 weight percent, 0.002 to 0.09 weight percent, or 0.005 to 0.07 weight percent of the coating composition based on the total weight of the coating composition. The antioxidant can help to protect the aqueous dispersion, e.g., at high cure temperatures. Embodiments of the present disclosure provide that the antioxidant comprises a hindered phenolic. An example of the hindered phenolic includes, but is not limited to, pentaerythritol tetrakis(3-(3,5-di-tert-butyl-4-hydroxyphenyl)propionate, which is commercially available as IRGANOX™ 1010, available from Ciba.

Embodiments of the present disclosure provide that the coating composition can include an additive. Examples of the additive include, but are not limited to, fillers, catalysts, wetting agents, defoamers, flow agents, release agents, slip agents, anti-blocking agents, additives to mask sulfur staining, pigment wetting/dispersion agents, anti-settling agents, UV stabilizers, adhesion promoters, corrosion inhibitors, pigments, e.g. titanium dioxide, mica, calcium carbonate, barium sulfate, silica, zinc oxide, milled glass, aluminum trihydrate, talc, antimony trioxide, fly ash, and clay or the like; optionally one or more solvents, e.g. glycols, glycol ether, 2,2,4-trimethyl-1,3-pentanediol monoisobutyrate, mineral spirits, and benzoate esters or the like; optionally one or more dispersants, e.g. aminoalcohols, and polycarboxylates, optionally one or more defoamers, optionally one or more preservatives, e.g. biocides, mildewcides, fungicides, algaecides, and combinations thereof, optionally one or more thickeners, e.g. cellulosic based thickeners such as hydroxyethyl cellulose, hydrophobically modified alkali soluble emulsions, hydrophobically modified ethoxylated urethane thickeners, and combinations thereof, among others. Different amounts of the various additives may be utilized for different coating applications.

As mentioned, the coating compositions disclosed herein may be applied to a substrate. Examples of the substrate include, but are not limited to, beverage cans, food cans; aerosol containers such as those for non-food products, e.g. hair spray, hair dye, or color spray lacquers; drums; kegs; pails; decorative tins; open trays; tubes; bottles; monoblocs; caps, lids such as thin aluminum foil based lids for yogurt and butter containers, or crown corks; closures for glass jars and bottles such as roll-on closures, vacuum closures, pilfer-proof closures, easy peel lids for can closures, and easy open end or conventional ends for cans, among others. Cans, to which the coating compositions disclosed herein may be applied, can be 2 piece cans or 3 piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like. Such cans may have various shapes; for example, such can may have a cylindrical shape, cubical, spherical, semi-spherical, bottle shape, elongated cubical shape, shallow or tall shape, round or rectangular shape or other suitable shape, or a combination thereof. According to a number of embodiments, the substrate comprises a metal, e.g., a metal substrate. Examples of the metal include, but are not limited to, aluminum and aluminum alloys, steel, electrolytic tinplate cold rolled low carbon mild steel, electrolytic chromium/chromium oxide coated cold rolled low carbon mild steel, and other pre-treated steels. Pretreatment may include, but is not limited to, treatment with phosphoric acid, zirconium phosphate, chromium phosphate, and the like as well as silanes for reasons such as primary corrosion protection and improved adhesion. The metal substrate may comprise a sheet, strip or a coil. The substrate may be pre-coated with one or more pre-coating compositions. Such pre-coating compositions include, but are not limited to, one or more resin binders, one or more resin crosslinkers, one or more solvents, one or more additives, and one or more pigments. Examples of resin binders include, but are not limited to, epoxy, polyester, polyvinyl chloride containing organosols/vinyls, phenolic, alkyd, oleoresin, acrylic resin, and the like. Examples crosslinkers include, but are not limited to, phenol-formaldehyde resins; amino-formaldehyde resins including but not limited to urea-formaldehyde, melamine formaldehyde, benzoguanamine formaldehyde; anhydride resins, blocked isocyanate resins and epoxy groups containing resins, including but not limited to, epoxy resins, epoxy groups containing polyesters, acrylic resins, vinyl resins or the like. Examples of solvents and thinners include, but are not limited to, glycol ethers, alcohols, aromatics, e.g. aromatic hydrocarbons, white spirit, branched ketones and esters. Examples of additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum. The substrate may also be pre-coated with one or more pre-coated laminate compositions. Such compositions may, for example, include polyethylene, polypropylene, or polyester compositions, and may be applied either as a film via film lamination process or melt-extrusion coating process onto the metal substrate.

The substrate may be formed via stamping, drawing, redrawing, wall ironing, bending, beading, embossing, debossing, flanging, necking, stretching, blow-stretching and/or other suitable conventional methods. Such methods are known to those having ordinary skill in the art. According to a number of embodiments, the coating compositions may, for example, be applied to the substrate, e.g. metal sheet or metal foil, and then the coated substrate may be formed into a coated article, e.g., a container device or a coated closure device. According to a number of embodiments, the substrate may be formed into a container, e.g., a container device or a closure device, and then the container device or the closure device can be coated with the coating compositions to form the coated article. The coating compositions may be applied by various methods; for example, via roller coating, spray coating, powder coating, dip coating, electrodeposition coating, printing, wash coating, flow coating, draw down coating, and/or curtain coating. The coating, i.e. the coating composition applied to the substrate, may have a thickness in the range of 0.01 micrometers (μm) to 2 millimeters (mm). All individual values and subranges from 0.01 μm to 2 mm are included herein and disclosed herein; for example, the coating may have a thickness from a lower limit of 0.01 μm, 0.05 μm, or 1 μm, to an upper limit of 2 mm, 1.5 mm, or 1 mm. For example, the coating may have a thickness 0.01 μm to 2 mm; 0.05 μm to 1.5 mm; or in the alternative, 0.1 μm to 1 mm. According to a number of embodiments, the coating may have a thickness in a range of 5 μm to 50 μm.

The coating composition applied to the substrate may be cured, e.g., to form a cured coating. The curing process can comprise drying, e.g., air drying, convection oven drying, hot air drying, and/or infrared oven drying, among others. According to a number of embodiments, the curing can include radiation cure, e.g. electron-beam cure. The coating compositions applied to the substrate may be cured at a temperature in the range of 10° C. to 375° C. for a period of less than 60 minutes, for example, less than 40 minutes, less than 30 minutes, less than 20 minutes, less than 10 minutes, less than 5 minutes, less than 2 minutes, less than 1 minute, or less than 20 seconds. All individual values and subranges from 10° C. to 375° C. are included herein and disclosed herein; for example, the coating compositions applied to the substrate may be cured at a temperature in the range of 15° C. to 260° C. for a period of less than 60 minutes, for example, less than 40 minutes, less than 20 minutes, less than 10 minutes, less than 5 minutes, less than 2 minutes, or less than 1 minute, or in the alternative, the coating composition applied to the substrate may be cured at a temperature in the range of 15° C. to 235° C. for a period of less than 60 minutes, for example, less than 40 minutes, less than 10 minutes, less than 5 minutes, less than 2 minutes, or less than 1 minute. The cured coating may have a thickness in the range of 0.01 micrometers μm to 2 millimeters mm. All individual values and subranges from 0.01 μm to 2 mm are included herein and disclosed herein; for example, the cured coating may have a thickness from a lower limit of 0.01 μm, 0.05 μm, or 1 μm, to an upper limit of 2 mm, 1.5 mm, or 1 mm. For example, the cured coating may have a thickness 0.01 μm to 2 mm; 0.05 μm to 1.5 mm; or in the alternative, 0.1 μm to 1 mm. According to a number of embodiments, the cured coating may have a thickness in a range of 1 μm to 50 μm.

As mentioned, the coating compositions disclosed herein, which include an abrasion reducing composition, are able to provide a continuous cured coating with a desirable coefficient of friction, e.g., as indicated by a reduced abrasion value. For example, a continuous cured coating can by formed by curable composition having a reduced abrasion value as compared to a non-continuous cured coating formed from a composition having a relatively higher abrasion value. The continuous cured coating identified by an appearance rating determined by visual inspection, e.g. with magnification. Coefficient of friction ratings for cured coatings can be determined, for example, via lateral dragging of a steel ball across the cured coating and determining a ratio of the lateral frictional force for a respective sample to the normal force from the steel ball. Continuous cured coatings having a desirable coefficient of friction are useful for some coating applications.

EXAMPLES

In the Examples, various terms and designations for materials were used including, for example, the following:

Polyolefin (polypropylene, 6D43 polypropylene, available from The Dow Chemical Company), stabilizing agent (ethylene-acrylic acid copolymer, PRIMACOR™ 5980i, available from the Dow Chemical Company), compatibilizer (propylene-maleic anhydride graft copolymer, LICOCENE® 6452, available from Clariant), antioxidant (pentaerythritol tetrakis(3-(3,5-di-tert-butyl-4-hydroxyphenyl)propionate, IRGANOX™ 1010, available from Ciba), solvent (diethylene glycol monoethyl ether, available from Acros Organics), base (dimethylethanolamine, available from Huntsman), crosslinker (hydroxyalkyl amide, Primid® QM-1260, available from EMS-GRILTECH), solvent (ethylene glycol, available from MEGlobal), polyether-polyester modified hydroxy functional polysiloxane (BYK® 375 [25 weight percent polyether-polyester modified hydroxy functional polysiloxane, 75 weight percent dipropylene glycol monomethyl ether], available from BYK), wax (carnauba wax, AQUACER® 1547 [35 weight percent wax, 65 weight percent water], available from BYK), wax (Fischer-Tropsch wax, SLIP-AYD® SL 404 [18 weight percent wax, 82 weight percent 2-Butoxyethanol], available from Elementis), lubricant (polytetrafluoroethylene, FLUORO A [100 weight percent polytetrafluoroethylene], available from Shamrock Technologies), lubricant (hydroxy functional polysiloxane, 163 Additive [100 weight percent hydroxy functional polysiloxane], available from DOW CORNING®), lubricant (polydimethylsiloxane, 200 Additive [100 weight percent polydimethylsiloxane], available from DOW CORNING®).

Example 1

Coating Composition

A coating composition, Example 1, was prepared by, as follows. An aqueous dispersion was prepared as follows. Polypropylene added at 212 grams per minute, PRIMACOR™ 5980i, added at 68 grams per minute, and LICOCENE® 6452 added at 23 grams per minute were fed into a 25 mm diameter twin screw extruder by a controlled rate feeder where they were forwarded and melted. The extruder temperature profile was ramped up to approximately 160° C. Water and base were mixed together and fed to the extruder at 41 grams per minute as a neutralizing agent. Dilution water was fed via two separate pumps to two locations into a dilution zone of the extruder. The extruder temperature profile was cooled back down to a temperature below 100° C. by the end of the extruder. The extruder speed was approximately 1200 rpm. At the extruder outlet, a backpressure regulator was used to adjust to a suitable pressure inside the extruder barrel to reduce steam formation. The aqueous dispersion was filtered through a 200 micron filter. The aqueous dispersion had a solids content of 47 weight percent and a mean particle size of 1.1 microns. Thereafter, the aqueous dispersion was manually stirred and filtered (50 micron filter) and added to a first container to provide a filtered aqueous dispersion (351.54 grams). PRIMID® QM-1260 (2.523 grams) was added to the contents of the first container while stirring at 375 rotations per minute with a Cowles blade. Base (0.313 grams) that had been mixed into water (104.18 grams) was added to the contents of the first container over an interval of approximately one minute while the stirring continued. Ethylene glycol (17.42 grams) was added to the contents of the first container over an interval of approximately one minute while the stirring continued. IRGANOX™ 1010 (0.17 grams) that had been dissolved in diethylene glycol monoethyl ether (17.42 grams) was added to the contents of the first container over an interval of approximately one minute while the stirring continued. The contents of the first container were covered and stirred for 15 minutes. A 30 gram aliquot was taken from the first container and then poured into a second container and BYK® 375 (0.024 grams) and AQUACER® 1547 (0.30 grains) were added to the contents of the second container while the stirring continued to provide Example 1. Example 1 was covered and stirred at 450 rotations per minute for 15 minutes.

Example 2

Coating Composition

A coating composition, Example 2, was prepared as follows. Example 2 was prepared as Example 1 with the change that BYK® 375 (0.012 grams) was used in place of the BYK® 375 (0.024 grams (from Example 1)) and AQUACER® 1547 (0.15 grams) was used in place of the AQUACER® 1547 (0.15 grams (from Example 1)).

Example 3

Coating Composition

A coating composition, Example 3, was prepared as follows. Example 3 was prepared as Example 1 with the change that AQUACER® 1547 (0.15 grams) was used in place of the AQUACER® 1547 (0.30 grams (from Example 1)).

Example 4

Coating Composition

A coating composition, Example 4, was prepared as follows. Example 4 was prepared as Example 1 with the change that filtered aqueous dispersion (117.18 grams) was used in place of the filtered aqueous dispersion (351.54 grams), PRIMID® QM-1260 (0.841 grams) was used in place of the PRIMID® QM-1260 (2.523 grams), base (0.104 grams) was used in place of the base (0.313 grams), water (34.73 grams) was used in place of the water (104.18 grams), ethylene glycol (5.805 grams) was used in place of the ethylene glycol (17.42 grams), IRGANOX™ 1010 (0.055 grams) was used in place of IRGANOX™ 1010 (0.17 grams), diethylene glycol monoethyl ether (5.805 grams) was used in place of the diethylene glycol monoethyl ether (17.42 grams), a 10 gram aliquot was used in place of the 30 gram aliquot, BYK® 375 (0.004 grams) was used in place of the BYK® 375 (0.024 grams (from Example 1)) and SLIP-AYD® SL 404 (0.1 grams) was used in place of the AQUACER® 1547.

Example 5

Coating Composition

A coating composition, Example 5, was prepared as follows. Example 5 was prepared as Example 4 with the change that SLIP-AYD® SL 404 (0.3 grams) was used in place of SLIP-AYD® SL 404 (0.1 grams).

Example 6

Coating Composition

A coating composition, Example 6, was prepared as follows. Example 6 was prepared as Example 4 with the change that SLIP-AYD® SL 404 (0.3 grams) was used in place of the BYK® 375 and the AQUACER® 1547.

Example 7

Coating Composition

A coating composition, Example 7, was prepared as follows. Example 7 was prepared as Example 4 with the change that SLIP-AYD® SL 404 (0.1 grams) was used in place of the BYK® 375 and the AQUACER® 1547.

Comparative Example A

Comparative Example A was prepared as follows. Comparative Example A was prepared as Example 1 with the change that filtered aqueous dispersion (97.62 grams) was used in place of the filtered aqueous dispersion (351.54 grams), PRIMID® QM-1260 (0.706 grams) was used in place of the PRIMID® QM-1260 (2.523 grams), base (0.058 grams) was used in place of the base (0.313 grams), water (19.29 grams) was used in place of the water (104.18 grams), ethylene glycol (9.68 grams) was used in place of the ethylene glycol (17.42 grams), IRGANOX™ 1010 (0.045 grams) was used in place of IRGANOX™ 1010 (0.17 grams), diethylene glycol monoethyl ether (9.68 grams) was used in place of the diethylene glycol monoethyl ether (17.42 grams), a 10 gram aliquot was used in place of the 30 gram aliquot, and FLUORO A (0.05 grams) was used in place of the BYK® 375 and AQUACER® 1547.

Comparative Example B

Comparative Example B was prepared as follows. Comparative Example B was prepared as Example 1 with the change that filtered aqueous dispersion (45.56 grams) was used in place of the filtered aqueous dispersion (351.54 grams), PRIMID® QM-1260 (0.329 grams) was used in place of the PRIMID® QM-1260 (2.523 grams), base (0.041 grams) was used in place of the base (0.313 grams), water (13.54 grams) was used in place of the water (104.18 grams), ethylene glycol (2.24 grams) was used in place of the ethylene glycol (17.42 grams), IRGANOX™ 1010 (0.021 grams) was used in place of IRGANOX™ 1010 (0.17 grams), diethylene glycol monoethyl ether (2.24 grams) was used in place of the diethylene glycol monoethyl ether (17.42 grams), a 10 gram aliquot was used in place of the 30 gram aliquot, and FLUORO A (0.05 grams) was used in place of the BYK® 375 and AQUACER® 1547.

Comparative Example C

Comparative Example C was prepared as follows. Comparative Example C was prepared as Comparative Example A with the change that 163 Additive (0.05 grams) was used in place of the FLUORO A (0.05 grams).

Comparative Example D

Comparative Example D was prepared as follows. Comparative Example D was prepared as Comparative Example A with the change that 200 Additive (0.05 grams) was used in place of the FLUORO A (0.05 grams).

Comparative Example E

Comparative Example E was prepared as follows. Comparative Example E was prepared as Example 1 with the change that BYK® 375 (0.395 grams) was added to the contents (493.56 grams) of the first container rather than taking a 30 gram aliquot from the first container and then adding BYK® 375 and AQUACER® 1547.

Comparative Example F

Comparative Example F was prepared as follows. Comparative Example F was prepared as Comparative Example E with the change that AQUACER® 1547 (9.873 grams) was used in place of the BYK® 375.

Example 8

Coated Article

A coated article, Example 9, was prepared as follows. Aluminum panels (can stock clean aluminum measuring 0.009×4"×12" from All Foils), were cleaned with acetone, and then dried. Approximately 12 hours after Example 1 was prepared, Example 1 (approximately 3 grams) was applied to the aluminum panel via a #13 wirewound drawdown bar to coat (20 microns to 30 microns wet coating thickness) a surface of the aluminum panel to provide Example 8.

Examples 9-14

Coated Articles

Coated articles, Examples 9-14, were prepared as follows. Examples 9-14 were prepared as Example 8 with the change that Examples 2-7 were respectively used in place Example 1.

Comparative Examples G-L

Comparative Examples G-L were prepared as follows. Comparative Examples G-L were prepared as Example 8 with the change that Comparative Examples G-L were respectively used in place Example 1.

Example 15

Coated Article with Cured Coating

A coated article with a cured coating, Example 15, was prepared as follows. Example 8 was placed in a 295° C. convention oven for approximately 25 seconds to cure the coating composition and provide Example 15.

Examples 16-21 Coated Articles with Cured Coatings

Coated articles with cured coatings, Examples 16-21, were prepared as follows. Examples 16-21 were prepared as Example 15 with the change that Examples 9-14 were respectively used in place Example 8.

Comparative Examples M-R

Comparative Examples M-R were prepared as follows. Comparative Examples M-R were prepared as Example 15 with the change that Comparative Examples G-L were respectively used in place of Example 8.

Coefficient of friction ratings for Examples 15-21 and Comparative Examples M-R were determined by respectively fixing each of Examples 15-21 and Comparative Examples M-R in horizontal position such that the cured coatings faced upward. A steel ball, having a 0.25 inch diameter, was placed respectively on the cured coatings of each of Examples 15-21 and Comparative Examples M-R with a normal force of 0.5 newtons. The steel ball was dragged laterally across the cured coatings of each of Examples 15-21 and Comparative Examples M-R to measure a lateral fictional force. Coefficient of friction ratings for Examples 15-21 and Comparative Examples M-R are defined as a ratio of the lateral frictional force for a respective sample to the normal force. Coefficient of friction ratings are reported in Table 1.

Appearance ratings for Examples 15-21 and Comparative Examples M-R were determined by visual inspection with 10× magnification according to a continuous qualitative scale, whereby an appearance rating of "0" indicated a non-continuous cured coating with prominent holes in the cured coating, exposed metal, extensive surface roughness, and/or extensive discoloration; an appearance rating of "1" indicated a continuous cured coating, some surface roughness, and/or some discoloration; and an appearance rating of "2" indicated a smooth continuous coating having no visible defects. Appearance ratings are reported in Table 1.

Continuous cured coatings, e.g., cured coatings with an appearance rating of 1.0 or greater, having a reduced abrasion value, which may be indicated by a desirable coefficient of friction, e.g., a coefficient of friction rating of 0.15 or less, are useful for some coating applications.

TABLE 1

|  | Coefficient of friction rating (unit less) | Appearance rating (unit less) |
|---|---|---|
| Example 15 | 0.08 | 1.5 |
| Example 16 | 0.12 | 2.0 |
| Example 17 | 0.11 | 2.0 |
| Example 18 | 0.07 | 2.0 |
| Example 19 | 0.06 | 2.0 |
| Example 20 | 0.10 | 2.0 |
| Example 21 | 0.14 | 2.0 |
| Comparative Example M | 0.16 | 0.25 |
| Comparative Example N | 0.31 | 0.5 |
| Comparative Example O | 0.40 | 0.0 |
| Comparative Example P | 0.40 | 0.0 |
| Comparative Example Q | 0.09 | 0.5 |
| Comparative Example R | 0.20 | 2.0 |

The data in Table 1 show that each of Examples 15-21 was a continuous cured coating. Additionally, the data in Table 1 show that each of Examples 15-21 had coefficient of friction rating of 0.15 or less, indicating a reduced abrasion value. The data in Table 1 show that each of Examples 15-21 are useful for some coating applications because each of Examples 15-21 had a coefficient of friction rating of 0.15 or less and an appearance rating of 1.5 or greater.

The data in Table 1 show that Comparative Examples M-P and R each had a coefficient of friction rating greater than 0.15. Additionally, the data in Table 1 show that Comparative Examples M-Q each had an appearance rating of less than 1.0 Comparative Example Q did have a coefficient of friction rating 0.09; however Comparative Example Q was not a continuous cured coating, as evidenced by the appearance rating of 0.5. Comparative Example R was a continuous cured coating, as evidenced by the appearance rating of 2; however Comparative Example R did not have a coefficient of friction rating of 0.15 or less.

The data in Table 1 show that each of Examples 15-21 were improved continuous cured coatings as compared to each of Comparative Examples M-R.

What is claimed:

1. An coating composition comprising:
   from 50 to 85 percent of an aqueous dispersion based on a total weight of the coating composition, wherein the aqueous dispersion comprises a melt blending product of (a) a base polymer comprising at least one polyolefin, (b) a polymeric stabilizing agent, and (c) a compatibilizer, wherein the aqueous dispersion has a solid content from 15 weight percent to 70 weight percent based on a total weight of the aqueous dispersion, the solid content comprises from 50 to 85 percent by weight of the base polymer based on a total weight of the solids content, from 10 to 35 percent by weight of the stabilizing agent based on the total weight of the solids content, and from 2 to 15 percent by weight of the compatibilizer based on the total weight of the solids content;
   an abrasion reducing composition comprising a hydroxy functional polysiloxane wax that is from 0.01 weight percent to 0.10 weight percent of the coating composition based on the total weight of the coating composition;
   a solvent, wherein the solvent is from 3 weight percent to 20 weight percent of the coating composition based on the total weight of the coating composition;
   a basic water composition comprising from 90 to 99.99 percent by weight of the water based on a total weight of the basic water composition and from 0.01 percent to 10 percent by weight of a base based on the total weight of the basic water composition, wherein the basic water composition is from 10 weight percent to 25 weight percent of the coating composition based on the total weight of the coating composition; and
   a crosslinker, wherein the crosslinker is from 0.01 weight percent to 40 weight percent of the coating composition based on the total weight of the coating composition.

2. The coating composition of claim 1, wherein the hydroxy functional polysiloxane is polyether modified, polyester modified, or polyether-polyester modified.

3. The coating composition of claim 1, wherein the hydroxy functional polysiloxane has a hydroxyl equivalent weight of 500 to 2000 grams per hydroxyl equivalent.

4. The coating composition of claim 1, wherein the at least one polyolefin comprises polypropylene.

5. The coating composition of claim 1, wherein the solvent is selected from the group of ethylene glycol, diethylene glycol monoethyl ether, dipropylene glycol dimethyl ether, propylene glycol methyl ether, ethanol, dipropylene glycol methyl ether, and combinations thereof.

6. The coating composition of claim 1, wherein the crosslinker is a hydroxyalkyl amide.

7. The coating composition of claim 1, wherein the stabilizing agent is selected from the group of ethylene-acrylic acid copolymer, ethylene-methacrylic acid copolymer, and combinations thereof.

8. The coating composition of claim 1, wherein the compatibilizer comprises a maleic anhydride grafted polypropylene polymer.

9. An coating composition comprising:
   from 50 to 85 percent of an aqueous dispersion based on a total weight of the coating composition, wherein the aqueous dispersion comprises a melt blending product of (a) a base polymer comprising at least one polyolefin, (b) a polymeric stabilizing agent, and (c) a compatibilizer, wherein the aqueous dispersion has a solid content from 15 weight percent to 70 weight percent based on a total weight of the aqueous dispersion, the solid content comprises from 50 to 85 percent by weight of the base polymer based on a total weight of the solids content, from 10 to 35 percent by weight of the stabilizing agent based on the total weight of the solids content, and from 2 to 15 percent by weight of the compatibilizer based on the total weight of the solids content;

an abrasion reducing composition comprising a Fischer-Tropsch wax that is from 0.01 weight percent to 1.5 weight percent of the coating composition based on the total weight of the coating composition;

a solvent, wherein the solvent is from 3 weight percent to 20 weight percent of the coating composition based on the total weight of the coating composition;

a basic water composition comprising from 90 to 99.99 percent by weight of the water based on a total weight of the basic water composition and from 0.01 percent to 10 percent by weight of a base based on the total weight of the basic water composition, wherein the basic water composition is from 10 weight percent to 25 weight percent of the coating composition based on the total weight of the coating composition; and a crosslinker, wherein the crosslinker is from 0.01 weight percent to 40 weight percent of the coating composition based on the total weight of the coating composition.

10. The coating composition of claim 9, wherein the at least one polyolefin comprises polypropylene.

11. The coating composition of claim 9, wherein the solvent is selected from the group of ethylene glycol, diethylene glycol monoethyl ether, dipropylene glycol dimethyl ether, propylene glycol methyl ether, ethanol, dipropylene glycol methyl ether, and combinations thereof.

12. The coating composition of claim 9, wherein the crosslinker is a hydroxyalkyl amide.

13. The coating composition of claim 9, wherein the stabilizing agent is selected from the group of ethylene-acrylic acid copolymer, ethylene-methacrylic acid copolymer, and combinations thereof.

14. The coating composition of claim 9, wherein the compatibilizer comprises a maleic anhydride grafted polypropylene polymer.

* * * * *